June 13, 1933.  F. H. OWENS  1,913,853
FILM THREADING DEVICE FOR PHOTOGRAPHIC SOUND REPRODUCING APPARATUS
Filed June 18, 1929  2 Sheets-Sheet 2
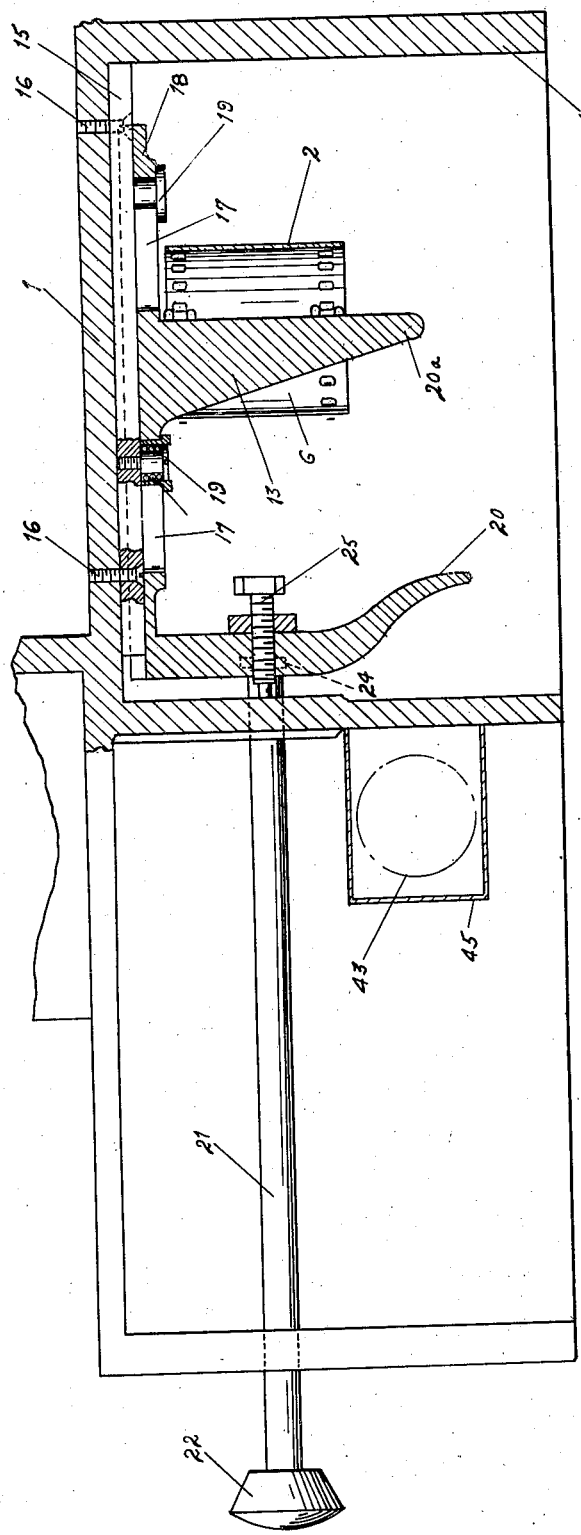
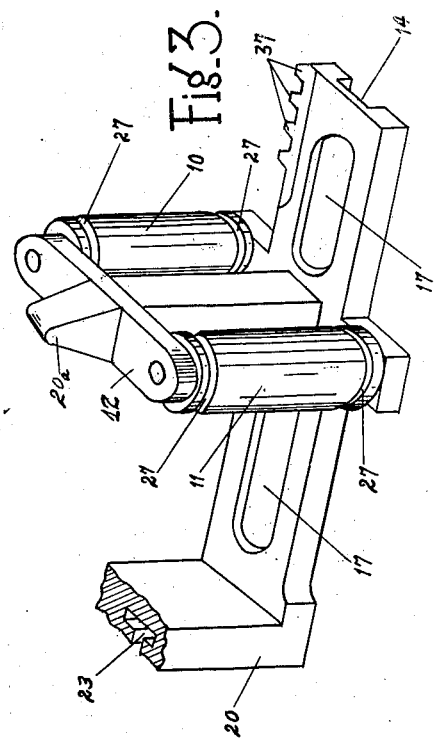
INVENTOR.
FREEMAN H. OWENS.
BY
ATTORNEY.

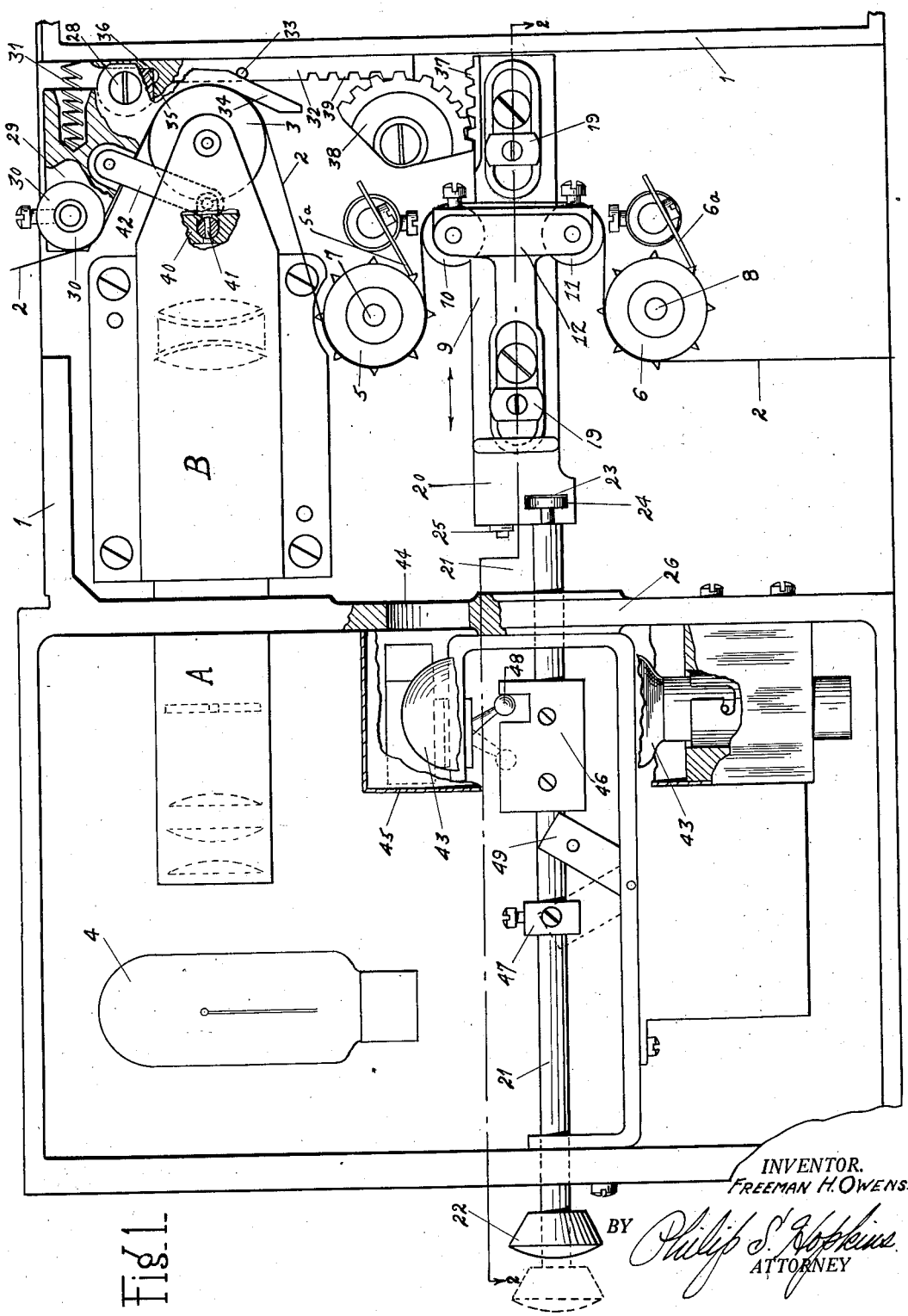

Patented June 13, 1933

1,913,853

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

FILM THREADING DEVICE FOR PHOTOGRAPHIC SOUND REPRODUCING APPARATUS

Application filed June 18, 1929. Serial No. 371,808.

This invention relates to improvements in film threading devices for photographic sound recording and reproducing apparatus, the principal object of the invention being to provide means for accurately determining the path of the film whereby the proper distance between the portion of the sound record which corresponds to a certain portion of picture images on the same film is maintained throughout the reproduction of the record.

A further object of the invention is to provide means for forming in the record-carrying film a loop of predetermined size between the film moving and the film take-up sprockets.

Another and important object is to provide a film tension roller, which when the apparatus is in threading position, is maintained at a fixed predetermined point, thus serving to define the path of the film being threaded, at such point, whereby a predetermined length of film is threaded and maintained between the picture projecting station and the sound reproducing station.

A further object of the invention is to provide means for positively locking the tension roller in its film path determining position during the threading operation.

A further object of the invention is to improve and simplify the general construction of an apparatus of the character set forth whereby a number of operations are performed in response to a single manual motion on the part of the operator.

Other objects and advantages of the invention will appear as the description proceeds.

In the drawings accompanying this specification,

Figure 1 is a partly sectional side view of an apparatus embodying the features of the present invention, the housing being left open to show the relative disposition of the parts;

Figure 2 is a longitudinal sectional view taken approximately on the line 2—2 of Figure 1; and Figure 3 is a perspective view of the controlling slide member constituting one of the features of the invention.

The same characters of reference designate the same parts in the different figures of the drawings.

I have shown my invention as applied to a sound reproducing apparatus, but it will be readily understood that with but slight modification it is equally adaptable to a sound recording apparatus.

Referring to the drawings, 1 designates a housing adapted for connection to for instance a motion picture projector within which housing is supported a lens assembly A and roller film support B similar to that described and claimed in my co-pending application Serial No. 360,871 filed May 6, 1929.

The film 2 is fed from the projector (not shown) into the housing and around the roller support 3 where the light from the reproducing lamp 4 acts upon said film in the manner described in my said co-pending application.

As is well known, it is essential that when a photographic sound record is recorded or printed on a film which also carries picture images thereon to be projected in synchronism with the reproduction of the sound record, a certain distance must be maintained between the sound record and the corresponding or appropriate picture images. This distance is usually approximately fourteen and one-half inches, and is made necessary by the fact that the point on the film at which the picture images are exposed and/or projected is that distance from the point at which the sound is recorded and/or reproduced. Heretofore, in providing for the exact length of film between the image projecting station in the projector and the sound reproducing station, it has been more or less guesswork or necessitating actual measurement. The present invention relates to the provision of means for providing a definite path for the film at least for a portion of the distance between said stations, whereby guess-work is largely eliminated.

It is also important that a loop be provided in the film between the feeding sprocket for the sound station and the take-up sprocket, thus relieving the tension or drag which would otherwise burden the feed sprocket and perhaps produce uneven pull of the film past the sound reproducing station. I have provided means for predetermining the path of the film during the threading operation whereby such a loop is automatically formed as the film is threaded through the apparatus. To this end, the film feed and take-up sprockets 5 and 6 respectively are mounted for rotation with shafts 7 and 8 respectively, mounted in the housing at a suitable distance apart, said sprockets having associated therewith the usual strippers 5ª and 6ª respectively. The film 2, after passing over the roller support 3, is threaded on the sprocket 5 and from thence on the take-up sprocket 6 by which it is fed to the take-up reel (not shown).

Between the sprockets 5 and 6 is disposed the loop-forming device, which comprises a slidable member 9 having secured thereon a pair of spindles on which are mounted for rotation a pair of guide rollers 10 and 11, the opposite ends of the spindles being journalled in and maintained at the proper distance apart by a strap or plate 12 secured to or integral with a block 13, which extends up from the slide member 9. The member 9 has formed in its underside a guide channel 14, and which channel rides on a guide plate 15 (Figure 2) secured by screws 16 to the wall of the housing. For removably retaining the member 9 on said plate, the member 9 is provided with a pair of elongated apertures 17, through each of which passes a screw 18, said screws being threaded into the plate 15 and each having at its outer end a turn-button 19 to ovate form, whereby when the buttons are turned with their major axes across the openings 17, the slide member 9 is retained on the plate, while when the buttons are turned so that their major axes extend longitudinally of said openings, the slide member can readily be lifted from the plate.

In Figure 2 one of the buttons is shown in releasing position, while the other is in position to retain the slide member on the plate. The slide member 9 is provided at one end with an upwardly extending lug 20, which may be offset at its upper portion to provide a convenient means for grasping it so as to manually operate the slide. In additon to this means, I have provided means whereby the slide can be operated from outside of the housing. This latter means comprises a rod 21 which extends outside of the housing and is provided with a head or button 22 for conveniently grasping the rod. The lug 20 carried by the slide 9 is provided with a vertically extending slot 23 which opens along its entire length at the rear side of the lug. This slot is for the accommodation of the head 24 of a rod 21. It will be readily seen that by grasping the head 22 and operating the rod by pushing it inward or pulling it outward the slide member 9 will be caused to slide in one direction or the other. Movement of the slide member is limited in the inward or forward direction by the abutment of its end against the side wall of the housing, while movement in the opposite or rearward direction is limited by a set screw 25 threaded in the lug 20, the other end of which screw will contact with a partition 26 in the housing when the slide is moved sufficiently far backward. By reason of this construction, it will be seen that with the film threaded around the rollers 10 and 11 and the sprockets 5 and 6, with the slide 9 in its extreme forward or threading positon, all as shown in Figure 1, if the slide is now pulled back to its extreme rear position, it will leave a loop of film between the sprockets. The rollers 10 and 11 are adapted, when the slide is in its rearmost position, to lie adjacent the sprockets 5 and 6 respectively, each of said rollers being provided adjacent to each end thereof with a circumferential groove 27 adapted to receive the sprocket teeth. In this manner the film is maintained in engagement with the sprockets, so that the loop formation is maintained during the passage of the entire film through the housing.

Pivoted in the housing at a point 28 adjacent to the roller support 3, is a lever in the form of a bell-crank, one arm 29 of which carries a rotatable film-tension roller 30, said arm being provided with a pocket in which is seated a helical spring 31, the free outer end of which engages the wall of the housing, as shown in Figure 1, under the tension of which spring the lever is normally maintained in such position that its roller 30 exerts pressure on the film thereby holding the latter taut. For swinging the lever on its pivot against the tension of the spring thereby to release the film from the pressure of the roller 30, a member 32 is mounted for sliding movement on the wall of the housing, said member having a roller or lug 33 adapted to engage an inclined surface 34 formed on the second arm of the bell-crank lever, whereby, as the roller rides up on said inclined surface, the lever will be swung on its pivot in a manner which will be readily understood. The slide member 32 is provided with a flat portion adapted, when the member is in its uppermost position, to abut against a flat face formed on the lever adjacent to its pivotal point, as shown at 35, Figure 1. The lever is also provided with a second flat face at right angles to the first and the slide member with a wedge-shaped nose 36 which passes between said second flat face and the wall of the housing and thus positively holds the lever in its neutral or threaded position. This positive locking of the lever determines the path of the film during the threading operation and largely controls and determines the length of the film between the picture projection station in the projector above (not shown) and the sound station at the roller support 3.

For causing sliding movement of the member 32, the slide 9 is provided at one edge thereof with rack teeth 37 in engagement with a segmental gear 38, which gear is also in mesh with rack teeth 39 formed on one edge of the slide 32. It will thus be seen that reciprocatory movement of the slide 9 will produce similar motion of the slide 32 whereby the bell-crank lever will be rocked on its pivot and positively held in such rocked position, as shown in Figure 1, whenever the slide 9 is pushed forward or toward the right. With the members in this position, the film 2 may be threaded around the roller 30, around the supporting roller 3, the sprocket 5, rollers 10 and 11 and sprocket 6. When the threading has been completed, the slide 9 is moved backward, or toward the left in Figure 1, either by means of the lug 20 or the extension 20ª on arm 13 or the button 22, whereupon the pressure of the roller 33 on the bell-crank lever will be relieved and the roller 30, under the influence of the spring 31, will act as a tension roller on the film, while the rollers 10 and 11 will lie adjacent the film on the sprockets 5 and 6 and thus ensure the proper contact of the sprocket teeth with said film.

Mounted in the housing 1 is a lamp 43, termed herein the service or threading lamp, the rays of which pass through an opening 44 in the partition 26 so as to illuminate the interior of the housing and facilitate the threading of the film. The lamp is enclosed by a shield 45 so as to prevent the rays of the lamp from reaching the eyes of the operator. The rod 21 carries a pair of lugs 46 and 47 for operating switches 48 and 49 respectively controlling the circuits to the service lamp, the reproducing lamp and the motor.

The film during its passage over the roller support 3 is subjected to the action of the light projected from the lamp 4 by means of the optical assembly A, said light passing through an opening in the end wall 40 of the roller film support B, which opening is controlled by a rotatable shutter 41. A link 42 is shown herein attached to the arm 29 of the bell-crank lever for automatically closing said shutter in case of the breakage of the film.

I claim:

1. A sound reproducing apparatus comprising a photographic sound translating unit, means for supporting a record carrying film for movement through said unit, movable means for defining a loop in said film during the threading thereof through the apparatus, means operated by said loop defining means for determining the path of the film to the unit, and means for positively locking said last named means in its path determining position, said locking means comprising interengaging parts between said loop forming and said path determining means.

2. A sound reproducing apparatus comprising a photographic sound translating unit, means for supporting a record carrying film for movement through said unit, a slidable member movable to one position to form a loop of predetermined size in the film, means for exerting tension on the film during its passage to the translating unit, and means operated by the movement of said slidable member to loop forming position for moving said tension means out of tensioning position and into fixed film path determining position.

3. A sound reproducing apparatus comprising a photographic sound translating unit, means for supporting a record carrying film for movement through said unit, a slidable member adapted to define a loop of predetermined size in the film, a spring-pressed pivoted lever adapted to exert tension on the film during its passage through the translating unit, and means operated by said slidable member for rocking said lever on its pivot against the tension of its spring and locking it in its rocked position thereby to determine the path of travel of the film toward the slidable member.

4. A sound reproducing apparatus comprising a photographic sound translating unit, means for supporting a record carrying film for movement through said unit, a slidable member having a pair of spaced-apart rollers adapted to define a loop of predetermined size in the film during the threading thereof, spring-pressed means for exerting tension on the film during its passage to the translating unit, and means actuated by said slidable member for locking said tension means out of operation during the threading of the film.

5. A sound reproducing apparatus comprising a photographic sound translating unit, means for supporting a record carrying film in operative relation to said unit, a pair of rotatable sprockets spaced apart from each other and adapted to engage the film and cause it to travel past said unit, a member slidable between said sprockets and having a pair of rollers normally in contact with the film thereby to hold it in engagement with said sprockets, means for moving said slidable member to carry its rollers into position to define a loop in the film between said sprockets during the threading of the film, means for exerting tension on the film during its passage to the translating unit, and means actuated by said slidable member for locking said tension means out of operation and in position to determine the path of the film.

6. A sound reproducing apparatus comprising a photographic sound translating unit, means for supporting a record carrying film in operative relation to said unit, a pair of rotatable sprockets spaced apart from each other and adapted to engage the film and cause it to travel past said unit, a member slidable between said sprockets and having a pair of rollers normally in contact with the film thereby to hold it in engagement with said sprockets, means for moving said slidable member to carry its rollers into position to define a loop in the film between said sprockets, a spring-actuated bell-crank lever having a roller adapted to engage the film thereby to impart tension thereto during its passage to the translating unit, a second slidable member adapted to engage said lever and rock it against the tension of its spring and having means for retaining the lever in its rocked position, and means between said slidable members for transmitting motion from the first to the second slidable member.

7. A sound reproducing apparatus comprising a photographic sound translating unit, means for supporting a record carrying film in operative relation to said unit, a pair of rotatable sprockets spaced apart from each other and adapted to engage the film and cause it to travel past said unit, a member slidable between said sprockets and having a pair of rollers normally in contact with the film thereby to hold it in engagement with said sprockets, means for moving said slidable member to carry its rollers into position to define a loop in the film between said sprockets, a spring actuated bell-crank lever having a roller adapted to engage the film thereby to impart tension thereto during its passage to the translating unit, a second slidable member adapted to engage said lever and rock it against the tension of its spring and having means for retaining the lever in its rocked position, both of said slidable members being provided with rack teeth, and a rotatable gear in mesh with the rack teeth of both members thereby to transmit motion from the first to the second slidable member.

8. A sound reproducing apparatus, a housing, a photographic sound translating unit within said housing, means for supporting a record-carrying film in operative relation to said unit, a spring-actuated lever having means adapted to engage the film thereby to impart tension thereto, a pair of rotatable sprockets spaced apart from each other and adapted to engage the film and cause it to travel past said translating unit, a slidable member releasably secured to the wall of the housing between said sprockets, a pair of rotatable rollers carried by said slidable member in spaced apart relation to each other, said rollers being adapted normally to retain the film in engagement with the sprockets, means for moving said slidable member into position to define a loop in the film between said sprockets, and means actuated by the slidable member during its movement to loop defining position for rocking said lever against the tension of its spring and having means for retaining the lever in its rocked position during the threading operation.

In testimony whereof, I affix my signature.

FREEMAN H. OWENS.